US005212924A

United States Patent [19]
Finkelstein

[11] Patent Number: 5,212,924
[45] Date of Patent: May 25, 1993

[54] INSULATED PANEL WITH EDGE LATCH APPARATUS

[75] Inventor: Burl Finkelstein, Shenandoah, Ga.

[73] Assignee: Kason Industries, Inc., Shenandoah, Ga.

[21] Appl. No.: 719,925

[22] Filed: Jun. 24, 1991

[51] Int. Cl.⁵ .............................................. E04B 2/82
[52] U.S. Cl. .................................. 52/583; 52/127.9; 52/584; 52/587
[58] Field of Search ............... 52/587, 601, 583, 584, 52/127.7, 127.9, 127.11; 292/111

[56] References Cited

U.S. PATENT DOCUMENTS

| | | | |
|---|---|---|---|
| 2,581,816 | 1/1952 | Schlueter | 52/127.9 |
| 3,310,917 | 3/1967 | Simon | 52/601 |
| 3,365,851 | 1/1968 | Cushman | 52/127.9 |
| 3,496,692 | 2/1970 | Melcher | 52/127.9 |
| 3,565,469 | 2/1971 | Zwart . | |
| 3,671,006 | 6/1972 | Berkowitz . | |
| 3,784,240 | 1/1974 | Berkowitz . | |
| 4,044,511 | 8/1977 | Lingle | 52/127.9 |
| 4,223,500 | 9/1980 | Clark et al. . | |
| 4,417,430 | 11/1983 | Loikitz | 52/584 |
| 4,512,122 | 4/1985 | Berkowitz . | |
| 4,574,537 | 3/1986 | Krieger . | |

FOREIGN PATENT DOCUMENTS 1346869 5/1972 United Kingdom .
1346870 5/1972 United Kingdom .

Primary Examiner—Michael Safavi
Attorney, Agent, or Firm—Kennedy & Kennedy

[57] ABSTRACT

An insulated panel 10 has embedded hook fasteners 13 and hook fastener 14 mounted on opposite sides of the panel which are coupled tautly together by embedded, flexible straps 22, which are releasably coupled with the fasteners. This coupling is done by interlocking T-shaped ends 36 of the straps in T-shaped slots 33 formed in wing anchors portions 32 of the fasteners.

4 Claims, 4 Drawing Sheets

INSULATED PANEL WITH EDGE LATCH APPARATUS

TECHNICAL FIELD

This invention relates generally to thermally insulated panels, and particularly to large insulated panel like those used to form cooler room walls, floors and ceilings.

BACKGROUND OF THE INVENTION

Walk-in type coolers, such as those commonly found in convenience stores today, are typically constructed of insulated wall, ceiling and floor panels that are fastened snugly together. The panels are usually comprised of foam insulation, such as expanded polyurethane, which may be encased within thin metallic sheets. The panel ends are shaped to fit together in tongue and groove fashion and are provided with latch type fastening means for drawing and holding them snugly together. The latches themselves are commonly comprised of a hook assembly mounted to one panel for latching engagement with a pin assembly mounted to an adjacent panel. Exemplary of these latches are those shown in U.S. Pat. Nos. 3,565,469, 4,223,500 and 4,417,430. These latch type fasteners are sometimes formed in situ during formation of the insulation into the shape of blocks while others are designed to be mounted to the insulation after they have been formed into panels.

The latches used in interlocking adjacent panels together have had problems associated with their incorporation into the panels and use. For example, where the latch members have not been formed in situ as the insulation is formed into blocks, a cavity has had to be cut into the insulation to receive the hook and pin assemblies. This has been tedious and inefficient and has often resulted in an unsightly product. Regardless of the method of incorporation, their design is such that as the latch hook is rotated into gripping engagement with a latch pin of an adjacent panel, a pulling force is exerted on both the hook assembly and on the pin assembly. Though this force beneficially serves to draw the panels snugly together, it also tends to dislodge the latch assemblies from the insulation. To prevent this dislodgement anchor wings have been added to the latch assemblies which substantially extend the surface area contact of the latches with the insulation and thereby spreads out the dislodging forces. Exemplary of this type of panel fastener is again that shown in U.S. Pat. No. 4,417,430. However, even with the addition of these wings the pulling forces are sometimes so great as still to dislodge a latch assembly so as to render it ineffective.

Banded systems have been devised to overcome the just described problem and to provide enhanced integrity. With these systems opposite ends of bands or rods are welded to the latches in opposite ends or sides of the panels so that latching forces applied to one latch is also applied to another latch. Although this definitely provided a more ruggedized panel with enhanced latch dislodgement resistance, such panels are quite costly to produce.

It thus is seen that a need remains for an insulated panel that may be fastened to adjacent panels of like construction in a more secure and yet less costly manner and with little risk of their latching mechanism being dislodged during latching operations. Accordingly, it is to the provision of such a panel and method of producing such that the present invention is primarily directed

SUMMARY OF THE INVENTION

In a preferred form of the invention, an insulated panel adapted to be interlocked with an adjacent insulated panel comprises a block of foam insulation. Latch type fasteners are mounted in the block adjacent opposite end walls. A flexible band is embedded in the block releasably coupling the pair of fasteners tautly together. The panel is made with a multiple piece mold that has interior surfaces shaped to form it with the mold pieces in a closed position and having opposite end walls to each of which a fastener support is mounted. With the mold opened, panel fasteners are releasably mounted to the fastener supports and a flexible band is mounted substantially taut to the pair of fasteners. The mold is then closed and foam insulation introduced into it about of fasteners and flexible band. The foam is solidified to form a hardened panel with the panel fasteners mounted along two or more panel end walls and internally coupled by the band. The mold is then opened and the panel removed.

DETAILED DESCRIPTION

Figure 1:
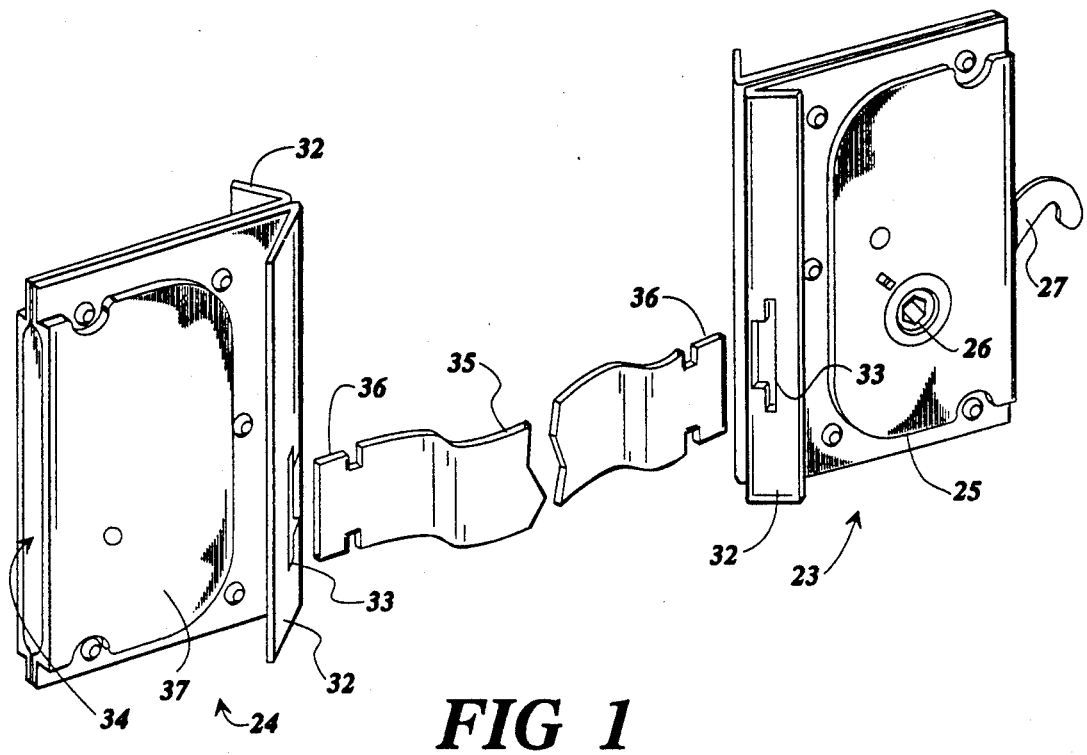
FIG. 1 is an exploded view, in perspective, of a latch type fastening apparatus for insulated panels that embodies principles of the invention in a preferred form.

With reference next to the drawings, there is shown an insulated panel 10 made in accordance with principles of the invention. The panel 10 comprises a block of foam insulation such as expanded polyurethane, which is conventionally encased between a rear cover sheet 12 and a front cover sheet 13, both of which are made of a thin sheet of metal. The insulation 11 has two exposed side edges 14, top edge 15, and bottom edge 16. Five rotatable hook type panel fasteners or latches 23, and five hook receiving and retaining fasteners or latches 24, are mounted within the block of insulation 11 about its periphery.

Figure 3:
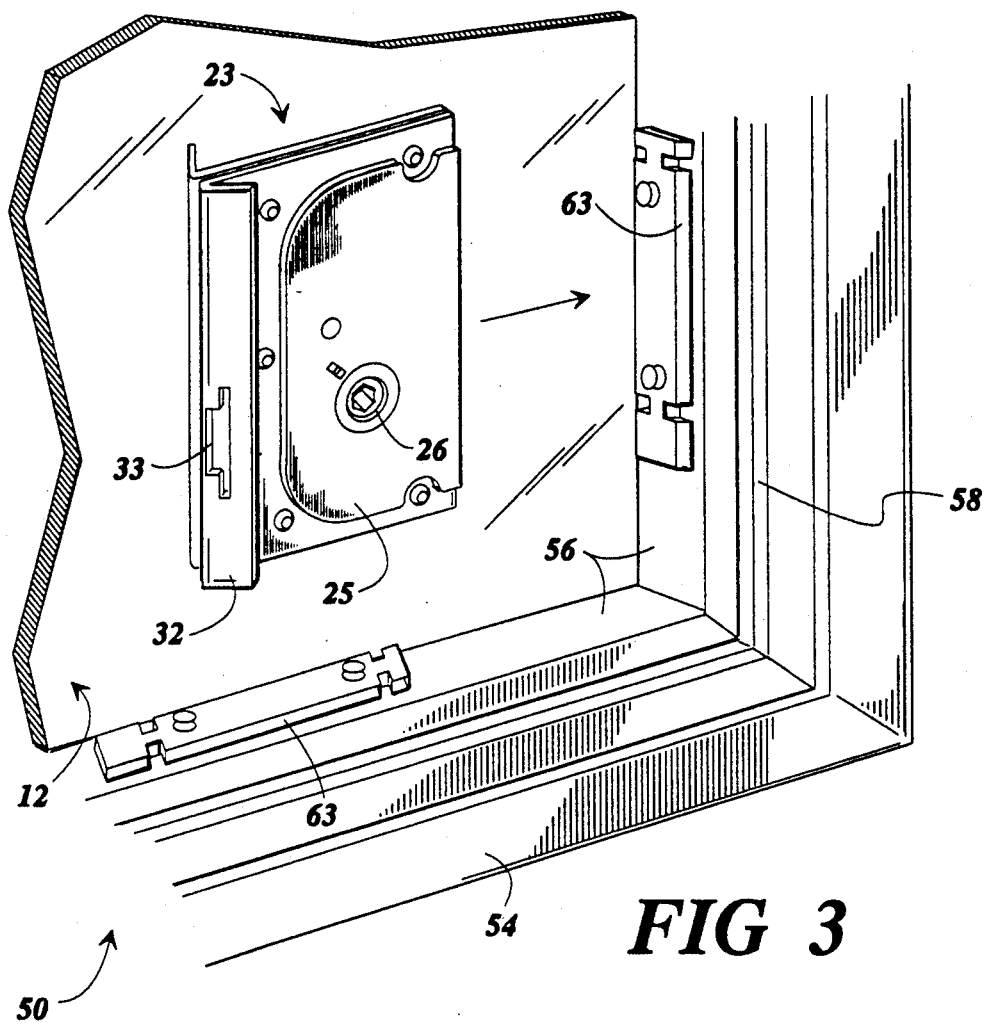
Figure 4:
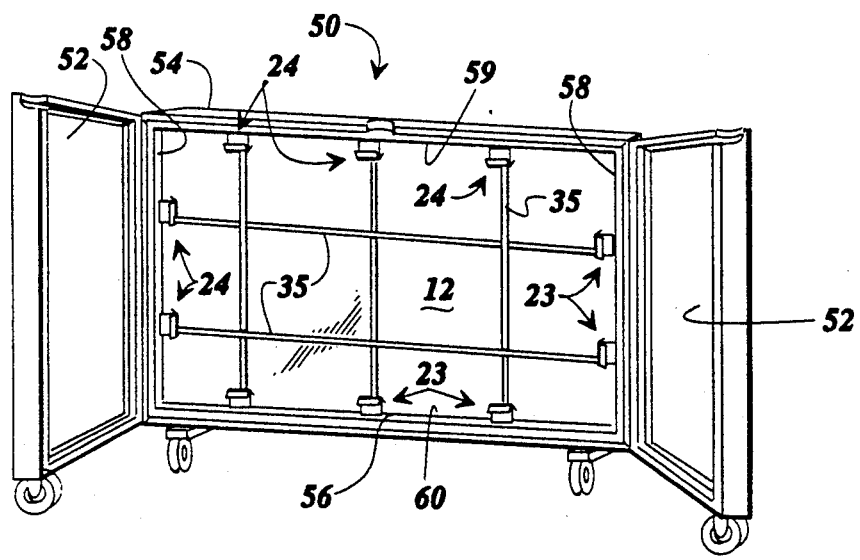

As best shown in FIGS. 1 and 3, each hook fastener 23 has a housing 25 with a key 26 that is linked with a hook 27 in an over center manner such that rotation of the key causes the hook to rotate and retract. A pair of wing anchors 32 extend at an acute angle backwards from the other end of the housing 25. The aforementioned U.S. Pat. No. 4,417,430 describes one such hook fastener in more detail. An access passage 28 in the block of insulation provides access to the key 26.

The hook receiving and retaining fastener 24 is similarly constructed with a housing 37 that has a receiving chamber 34 within which an unshown lock pin is transversely mounted. The receiving and retaining fastener 24 also has a pair of wing anchors 32 which extends at an acute angle backwards from an end of the housing 37 opposite to the open end of chamber 34. One wing of each of the fasteners 23 and 24 is formed with a T-shaped slot 33. A flexible, metallic strap 35 is coupled tautly between a hook fastener 23 and a hook receiving fastener 24 mounted on opposite side edges of the block of insulation 11. The straps are releasably coupled to the fastener wings with their T-shaped ends 36 held in the T-shaped slots 33.

Figure 6:
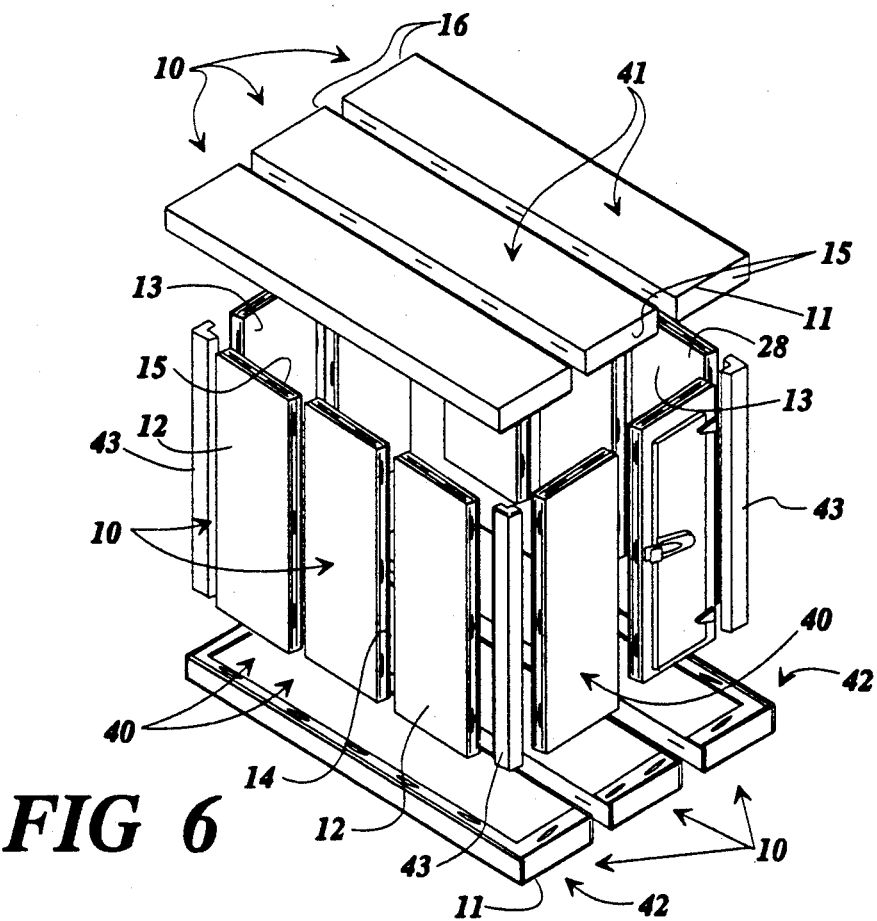
FIG. 6 is an exploded view, in perspective, of a walk-in refrigerator or cooler constructed with insulated panels of the invention.
Figure 7:
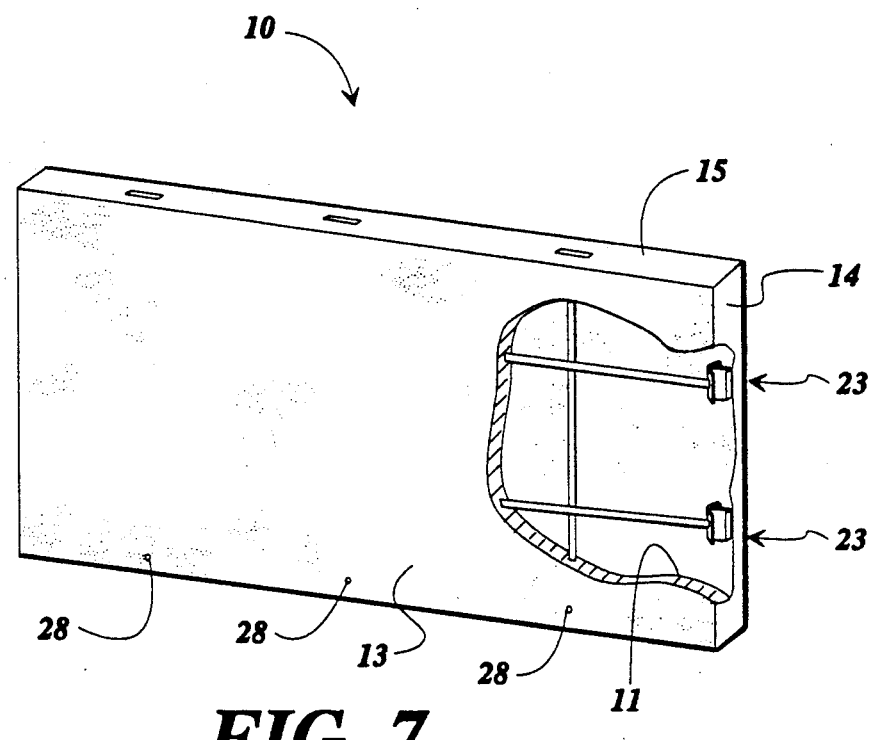
FIG. 7 is a perspective view of a panel shown with a portion broken away to reveal internal components.

As shown in FIG. 6, the panels 10 may be used as side wall panels 40, ceiling panels 41 and floor panels 42 to form a thermally insulated walk-in type cooler. Insulated corner 43 are provided which have fasteners adapted to mate with those of the side wall panel 5. Each wall panel 40 may be fastened to an adjacent wall panel 40 or corner 43, and also to a ceiling panel 41 and floor panel 42. Furthermore, each ceiling panel 41 may be fastened to an adjacent ceiling panel 41, and each floor panel 42 fastened to an adjacent floor panel.

The panels are conventionally fastened to each other by engaging a hook fastener with an adjacent hook receiving and retaining fastener of another panel. With two panels flush together, this is done by inserting a wrench through access passage 28 into a key 26 and rotating the key which rotates the hook into the receiving chamber 34 of the adjacent fastener and captures its lock pin. The hook movement draws the pin towards it thereby drawing the two adjacent panels snugly together. This drawing force is resisted by the fastener wing anchors 32. Furthermore, since each hook fastener of a panel is tautly connected to a hook receiving fastener of that same panel, the wing anchors of two fasteners provide additional fastener dislodgement resistance.

The panel 10 is preferably manufactured with a multiple piece fixture or mold 50 as shown in FIGS. 2-5. The mold has a rear wall 51 and two front walls 52 hinged to a side edge of the rear wall. The rear wall is bounded by a outer frame 54 and an inner frame 56 that is removably fitted within the outer frame 54. The inner frame 56 has two side members 58 releasably fastened to a top member 59 and to a bottom member 60. The inwardly facing surface of the inner frame 56 is shaped to form the side edges 14, the top edge 15 and the bottom edge 16 of a panel 10. Alternatively, the inner frame 56 may be made repositionable between a joined configuration and a separated configuration within the limits of the outer frame, thus eliminating the need of removing the inner frame from the outer frame.

As best shown in FIG. 3, adapters 63 are mounted to the inside of the inner frame 56. These adapters are configured to hold either a hook fastener 23 or a receiving fastener 24, dependent upon location. An adapter 63 configured to releasably hold a hook fastener 23 is mounted to an opposite side of the inner frame from an adapter configured to hold a hook receiving fastener 24 so that they face one another. They are mounted in this manner so that a hook fastener 23 of one panel 10 may be aligned to be coupled with a receiving fastener of an, adjacent panel 10 of like construction.

Figure 2:
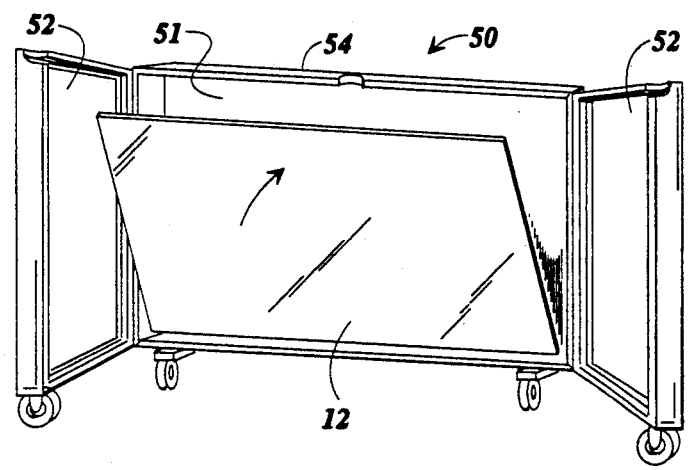
FIGS. 2-5 are a sequence of perspective views of a panel molding apparatus showing an insulated panel being manufactured in accordance with other principles of the invention.
Figure 5:
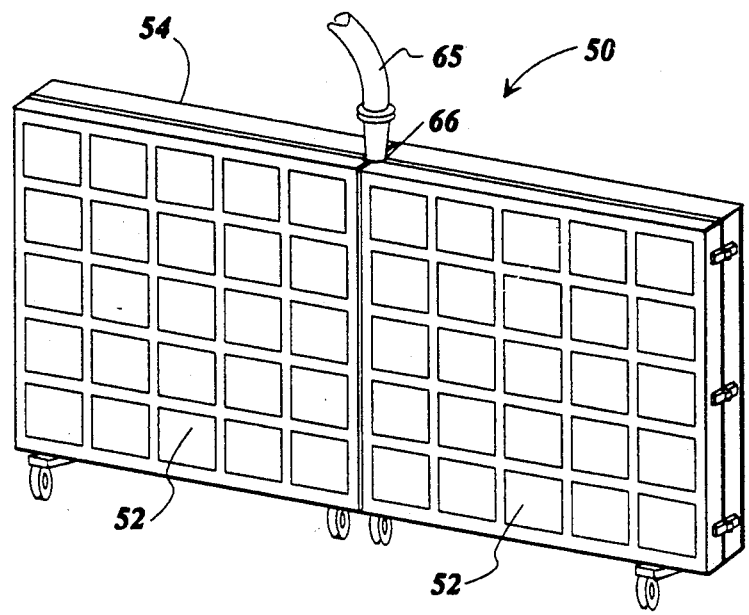

With the inner frame 56 removed from the outer frame 54, a rear cover sheet 12, which may be metallic or plastic, is mounted in the mold flush against the rear wall, as shown in FIG. 2. The inner frame 56 is then mounted against sheet 12 within the outer frame 54. A hook fastener or a hook receiving fastener is next mounted to an adapter 63. A flexible strap 35 is coupled with the fastener by passing one of its T-shaped ends 36 through the fastener slot 33 and pulling it taut thereby interlocking it with the fastener. The other end of the strap is coupled with a loose fastener which is then press fitted onto an adapter mounted to the opposite side of the inner frame 56. Other fasteners and straps are mounted in this manner until an array of ten fasteners and five straps are provided as the network shown in FIG. 4. The front cover sheet 13, is then mounted and the front walls 52 moved closed, as shown in FIG. 5. Foam insulation is then injected into the mold from an unshown supply through a delivery hose 65 and mold opening 66, which expands to fill the mold and embed the fasteners and straps.

Once the foam insulation has solidified the front walls 52 are swung open and the inner frame 56 removed with a newly formed insulation panel held within it. The frame is then dismantled which releases the fasteners from the adapters. An access passage 28 is finally cut into the panel in alignment with the key 26.

Once it had been thought that the density of foam used with winged fasteners had to be about three pounds per square foot for fasteners not to become dislodged. Now with winged fasteners used in combination with coupling straps the insulation density has been found to be able to be decreased to under two pounds per square foot without substantial loss in insulation properties or in structural integrity. This reduction in density also provides a distinct reduction in the overall cost of producing such panels. Furthermore, because a greater amount of force may now be applied on the fasteners, the number of fasteners themselves may be decreased for provides further cost reduction. The use of flexible straps with mechanical interlocks also greatly facilitates assembly and serves to avoid the need for welding.

From the foregoing it is seen that an insulated panel and method of manufacturing such is now provided which overcomes problems associated with those of the prior art. It should however be understood that the just described embodiment merely illustrates principles of the invention in a preferred form. Many modifications, additions and deletions may, in addition to those expressly recited, be made without departure from the spirit and scope of the invention as set forth in the following claims.

I claim:

1. An insulated panel adapted to be interlocked with an adjacent insulated panel and which comprises a block of foam insulation having opposite end walls; a pair of fastener means mounted in said block adjacent said opposite end walls, each of said fastener means has a housing and a wing flange that extends at an acute angle from an embedded end of said fastener means housing towards the other end of the housing, each of said wing flanges has a T-shaped slot; and a flexible band embedded in said block having T-shaped ends sized to be releasably coupled in said T-shaped slots of said wing flanges thereby releasably coupling said pair of fastener means tautly together.

2. The insulated panel of claim 1 wherein one of said fastener means has a housing in which a locking hook is pivotally mounted, and the other of said fastener means has a housing in which a lock bar is mounted.

3. Insulated panel latching apparatus comprising, in combination, a pair of winged panel fasteners each having an elongated housing from which a pair of V-shaped wings extend formed with a T-shaped slot; and a flexible band having opposite ends formed with a pair of slots formed in an end portion of said band along opposite sides of the ends of said bands for being releasably received within said T-shaped slots.

4. The insulated panel latching apparatus of claim 3 wherein one of said panel fasteners has a pivotable hook and the other panel fastener has a lock bar.

* * * * *